United States Patent Office 2,805,196
Patented Sept. 3, 1957

2,805,196
PERMSELECTIVE ELECTRODIALYSIS

Hermannus Gerhardus Roebersen, The Hague, and Cornelis van Bochove, Delft, Netherlands, assignors to Nederlandse Centrale Organisatie voor Toegepast-Natuur-Wetenschappelijk Onderzoek, The Hague, Netherlands, a corporation of the Netherlands No Drawing. Application February 6, 1953,
Serial No. 335,582

Claims priority, application Netherlands
February 11, 1952

5 Claims. (Cl. 204—151)

The application relates to a process for the manufacture of membrances combining high cation selective or anion selective properties and a good electric conductivity with extremely high ionic selectivity.

Up to now proposals for the improvement of the yield of electrodialytical desalting processes, in particular of seawater and brine-water, by using permselective membranes, have found little application in practise. Moreover, positive permselective membranes which allow only the anions to pass through, when electrodialyzing in aqueous solutions, are not available in a quality which has satisfactory characteristics for a long period of use.

Membranes of coagulated protein, wherein the negative groups are screened or neutralized, as, for example, the chromium-gelatine membranes, as well as membranes prepared by the adsorption of protamine on collodion, or of a basic substance e. g. certain dyes on collodion or on regenerated cellulose, have an electro-positive character.

However, these cation-selective membranes as produced so far generally have at least one of the following unfavorable characteristics, such as:

1. When electrodialyzing, the permselective properties of the membranes decrease rapidly by the action of certain electrolytes, present in the solutions or by the action of agents, developed at the electrodes by the electrodialyzing process.
2. The permeability for anions of many of these membranes is small and the conductivity only slight.
3. The ion-selective properties and the electro-positive character depend on the salt concentration and have low values at high salt-concentrations.
4. Many of these membranes have only an electro-positive character in a limited pH range and lose this property and even become electro-negative when they come into contact with solutions with a slightly higher pH.
5. Many of these membranes have insufficient strength when wet.
6. Some of the known membranes have a rough surface, which may adversely affect the power factor.

It is also proposed to prepare positive membranes from a homogeneous layer of anion-exchanger material, preferably on a backing material such as cloth or plastic fibres. These membranes have insufficient mechanical strength and should always be kept wet; consequently they should always be in contact with solutions, which causes difficulty with storage and transport.

Membranes of an electro-negative character, as e. g. membranes of oxidized regenerated cellulose or nitrocellulose, or of a homogeneous layer of cation-exchanger material, have slightly less unfavourable characteristics than the so-far known membranes of an electro-positive character, but it is difficult to produce them with sufficient mechanical resistance and sufficient mechanical strength, in sizes sufficiently large for application in technical apparatus.

It is an object of the invention to provide methods for the manufacture of improved membranes, which have a high strength when wet, have a good permeability either for certain cations or for certain anions, a high conductivity and a high selectivity either for anions or for cations, even if they are in contact with concentrated salt solutions and which maintain their ion-selective properties in a wide pH-range.

According to the invention a membrane of a material such as cellulose, transparent cellulose, regenerated cellulose, regenerated amylose, polyvinyl alcohol and of similar organic high-molecular materials with reactive hydroxyl groups is taken as starting material. These membranes are reacted in the known way with a compound, containing at least one methylol acid-amide-group. The membrane is then given an ion-selective character, by seeing to it that this compound contains besides this methylol acid-amide-group at least one ionic group or one group which is easily to be replaced by an ionic group. In the latter case said group should be replaced by an ionic group as a second processing stage. The reaction product is a membrane with excellent ion-selective properties, in which ionic groups are linked to carbon atoms of the high-molecular material by an

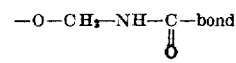

The action of N-methylol compounds without ionic groups upon cellulose is known and has been applied for quite another purpose, viz. for the improvement of the properties of tissues from cellulose, which is done in analogy with the results obtained by impregnating tissues with synthetic resins. For this purpose preferably chains of a paraffinic character were introduced, in order to give the tissues a more hydrophobic character, thus decreasing the swelling in water and increasing the strength of the tissues in the wet state.

Inter alia the methylol compounds of the acid amides wherein at least one hydrogen atom bound to a carbon atom has been replaced by halogen or by a trialkylamino-group or by a dialkylamino-group or a sulphonic acid group, have proved to be suitable for the production of ion-selective membranes. It is remarked that the introduction of the desired groups should take place under such conditions that the membrane itself is not damaged. This imposes a limitation on the reaction-temperature and, depending on the composition of the membrane, also on the nature of the reactive substance.

A particularly suitable active substance for the preparation of positive membranes according to the present invention is the methylol compound of carbamidomethyltrimethylammoniumhydrochloride

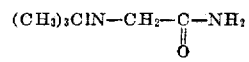

The reaction of a methylol acid-amido-group with high molecular polyoses or polyalcohols takes place by etherification.

Another suitable substance for this process is the methylol compound of chloro-acetamide. If one wants to produce a negative membrane from the compound thus obtained, the chlorine-atom may be replaced by a sulphonic acid group, e. g. by the action of potassium sulphite. According to this method an excellent negative membrane with good mechanical properties and good conductivity is obtained, which is resistant to and selective in the pressure of relatively strong salt solutions having a pH of 3–10.

A positive membrane is obtained by the action of dimethylamine upon the chlorine atom of the aforementioned etherous compound, by which reaction a dimethylamine-group is introduced under liberation of HCl. The positive character may further be intensified by the action of methyliodide.

The etherous bond is very stable, so that the ionic groups are not appreciably washed out by the action of water, diluted acid or diluted lye.

Already with the introduction of 4 or 5 of such groups per 100 monose-units in a membrane of regenerated cellulose, high-selective membranes are obtained, the electrical resistance of which is not high. Besides, these membranes are ion-selective in a very wide pH range owing to the presence of strong ionic groups. These membranes have also good mechanical properties.

The introduction of a higher percentage of ionic groups further intensifies the ion selective character, which may be of importance if relatively strong salt solutions, for example containing more than 1 gram mol per litre, must be electrodialyzed.

Surprisingly it appeared namely that ion-selective membranes produced according to this process preserved their selectivity at considerably strong salt concentrations of the liquid to be desalted and of the rinsing liquids.

As a standard for the selectivity of a membrane, the concentration potential, occurring when the membrane is fitted between solutions of a salt of different concentrations on both sides of the membrane as a partition, may be measured. Measuring is preferably carried out with KCl solutions, their diffusion potential being practically zero, so that, in the presence of a membrane, the potential difference measured is practically exclusively the result of the difference in transference numbers of anions and cations in the membrane. If the concentration of a KCl solution at one side of the membrane is ten times as great as that at the other side, at 18° C. a potential of $+58$ mv. is calculated for an ideal, positive membrane; the potential for an ideal negative membrane is $-58$ mv.

With a membrane into which quaternary ammonium-groups had been introduced in one of the above-mentioned ways, and the nitrogen content of which amounting to 0.6% (capacity 0.20 m. eq./g.), a concentration potential of $+55$ mv. was measured with the use of 0.001 N KCl against 0.01 N KCl; with the use of 0.01 N against 0.1 N KCl this value amounted to $+45$ mv. and with 0.1 N against 1 N KCl it yet amounted to about $+30$ mv., all measurements having been done at a pH of approx. 6. The selectivity was even somewhat stronger at a lower pH, it decreases somewhat at a higher pH, but a value of $+37$ mv. was nevertheless measured with solutions of 0.01 N KCl against 0.1 N KCl at a pH of 10.

A cellulose membrane into which quaternary ammonium-groups had been introduced in the same way and the nitrogen content of which amounted to approx. 1.3%, was even considerably more selective. The concentration-potential of such a membrane amounted to $+49$ mv. when 0.01 N KCl was used against 0.1 N KCl; the membrane-potential had a value of approx. $+20$ mv. when 0.3 N KCl was used against 3 N KCl.

Membranes into which about 3% of nitrogen had been introduced by a similar way of treatment, proved to be ion-selective with solutions of 3 grams equivalents NaCl per litre.

The cellulose tends to swell too strongly in water with a very high percentage of ionic groups. This can be compensated by simultaneously introducing a percentage of non-ionic bridge bonds, for example with formaldehyde or with the dimethylol compound of adipamide.

Negative values of the same absolute order were determined with membranes into which corresponding percentages of strong ionic acid groups had been introduced in the same way as described in the aforegoing.

The conductivity of the membranes treated according to the process of the invention is sometimes lower mostly, however, higher than that of the untreated membranes, and may be affected by the manner in which the bridge-bonds have been fitted.

Also amylose-membranes could be treated in an analogous way, as well as membranes of polyvinyl-alcohol which are made insoluble in water by the introduction of cross-linkages.

If desired, both the mechanical properties of the membranes and their remarkable resistance to substances as, for example chlorine, can further be improved by also fitting bridge-bonds between the chains of the high-molecular material containing reactive hydroxyl groups. Thus it was shown that the wet strength as well as the chlorine resistance of the aforementioned membranes with quaternary ammonium groups was increased by the formation of bridge-bonds between the cellulose molecules, which formation is accomplished by means of the methylol compound of the diamide of adipinic acid. Simultaneously the swelling in water is slightly reduced in consequence, and the conductivity decreased, in connection with the smaller swelling in water.

Another possibility for carrying out the process according to the application consists in the application of bridge-bonds, containing at least one ionic group or at least one atom or atom group which can be replaced by an ionic group. Thus it is possible for example to replace in adipamide one or more hydrogen atoms of the $CH_2$-groups by a halogen atom. Starting for instance from alpha-alpha'-dibromine-adipinic acid-diamide, the corresponding alpha-alpha'-adipamide disulphonic acid is obtained by the action of sodium sulphite, which alpha-alpha' adipamide disulphonic acid can be converted into the corresponding dimethylol compound by formaldehyde; with this latter compound cross-linkages can easily be applied between the cellulose chains by reaction of the methylol acid-amide-group with reactive hydroxyl-groups of high-molecular material such as cellulose.

*Example 1*

A solution is prepared from 152 g. carbamidomethyl-trimethylammoniumhydrochloride of the formula

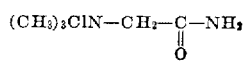

in 150 cc. water, whereby 75 cc. of a 40% aqueous solution of formaldehyde in which 6 g. $K_2CO_3$ have been dissolved, is added. This mixture is heated at 70° C. for 10 minutes and subsequently diluted with water to 660 cc. Finally oxalic acid is added, causing a pH of 2.

Membranes of regenerated dcellulose having a thickness of 0.12 mm. are impregnated in this bath at room temperature for approx. 5 minutes, the adhering liquid is removed, the membranes are dried and then heated in the air at approx. 140° C. for approx. 10 minutes.

The increase in weight amounts to 10-12%.

After this treatment the capacity was approx. 0.35 m. eq./g. dry substance, corresponding with 1.0% nitrogen.

The concentration potential measured between a solution of 0.1 N KCl and 0.01 N KCl amounted to $+53$ mv.; after a use of 250 hours in an electrodialysis apparatus yet $+47$ mv. The resistance of the material thus treated is approx. 4 ohms per cm.² surface in a solution of 0.1 N NaCl, measured with an alternating current of 50 C./S. The diffusion through the membrane, placed between a 0.1 N solution of NaCl and between water amounted to $30 \times 10^{-4}$ m. eq./cm.²/hour only. The increase in weight of the air-dry membrane in water is 80% by wt. The membranes are supple and are strong enough to be used in electrodialysis cells measuring, for example, 100 x 50 cm. without any danger of breaking down.

If a quantity of 5-10% dimethylol adipamide is added to the impregnation bath, bridge-bonds between the cellulose molecules are formed and membranes of the same concentration potential are obtained, with a slightly smaller swelling in water and a little higher electric resistance.

Example II

An impregnation bath is prepared by suspending 70 g. of the sodium salt of alpha-alpha' adipamide-disulphonic acid

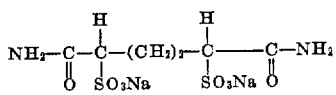

in 200 cc. of boiling water to which 30 g. aqueous formol solution of 40% by wt., also containing 2.4 g. $K_2CO_3$, is added. The bath is kept at a temperature of 60–70° C. for half an hour, cooled and then so much water is added to it that the volume is 400 cc. Oxalic acid is added until a pH of 2.5 has been reached.

In the same way as described in Example I regenerated cellulose is impregnated in this bath and subsequently dried. The capacity of the membranes thus treated is 0.37 m. eq. acid groups/g. dry substance.

When the membrane is placed between solutions of 0.1 N KCl and 0.01 N KCl, the concentration potential is approx. −50 m. volts; when the membrane is placed between the solution of 0.1 N NaCl and pure water the diffusion is approx. $17.10^{-4}$ m. eq./ cm.$^2$ per hour and the resistance approx. 8 ohms per cm.$^2$, measured with a membrane present in a solution of 0.1 N NaCl in water, and at 50 C./S.

Example III 38 g. chloroacetamide are dissolved in 50 cc. boiling water and 35 cc. of a 40% aqueous solution of formaldehyde in which 2 g. $K_2CO_3$ have been dissolved as catalyst, are added to these solution. After dilution to 1 litre, the pH is adjusted at 7.0 by means of concentrated hydrochloric acid. Then approx. 10 g. of oxalic acid are added, by which the pH decreases to below 2 giving a good impregnating solution. This solution is reactive with a membrane of regenerated cellulose, for half an hour, at room temperature. After that the adhering liquid is removed from this membrane, the membrane is dried in the air and is heated at a temperature of 140° C. for 10 minutes.

A. A 30% aqueous solution of dimethylamine is reacted with a thus treated membrane at a temperature of 60° C. for half an hour. After rinsing with water the membrane is dried in the air and is ready for use.

With solutions of 0.1 N KCl the concentration potential of such a membrance, determined at a pH of 2, 5 and 10 respectively, amounts to +53, +39 and +37 mv. respectively. If this membrance is subjected to an aftertreatment by converting the amino-group first into a basic form by rinsing with a 1% NaOH solution and subsequently rinsing with water until the membrane is free of alkali, and converting the amino-group into the quaternary ammonium salt-group by boiling for half an hour with a 10% solution of methyliodide in alcohol, after which the excess of methyliodide is removed by rinsing with water, a strongly positive membrane is obtained which is fairly ion-selective with salt concentrations containing 1 g. eq. of salt/l. and a pH of approximately 10.

B. Of the membrane into which a methylolchloroacetamide-group has been introduced in the way as described in the first part of this example, the chlorine is replaced by a sulphonic acid group by boiling with a 10% aqueous solution of sodium sulphite for half an hour. Such a membrane has a concentration potential of approx. −50 mv. at a pH of 5.5 when in contact with solutions of 0.1 N KCl against 0.01 N KCl; the resistance, measured in a solution containing 0.1 m. eq. NaCl/l. is 3.5 ohm/cm.$^2$ when measured with an alternating current of 50 C./S. at a temperature of 18° C.

Example IV 45 g. alpha-alpha'-bisdimethylamino-adipamidehydrochloride are dissolved in a mixture of 30 cc. of a 40% aqueous solution of formaldehyde and 10 cc. water. Then 40 cc. 30% NaOH are added, as the formation of the dimethylol compound preferably takes place in alkaline surroundings. 24 g. oxalic acid, containing crystallisation water, are added after one hour's standing at room temperature after which the precipitated acid-sodiumoxalate is removed by means of filtration.

A membrane of regenerated cellulose, having a thickness of approx. 0.12 mm. is soaked in the solution which has been diluted to 500 cc., for half an hour. Then the adhering liquid is removed. After drying in the air the membrane is heated at 100° C. for half an hour. A membrane which has thus been treated contains 0.7% of nitrogen, which corresponds with an increase in weight of approx. 3.5%.

Such a membrane is highly resistant to chlorine, has good mechanical properties (great strength in the wet state) and, consequently, a long life.

Example V

A membrane of polyvinylalcohol, impregnated in a solution of the methylol compound of carbamidomethyltrimethylammoniumhydrochloride, as described in Example I, swells very strongly in water, and loses so much of its strength that it is impracticable for larger surfaces.

A better result may be obtained with polyvinylalcohol in the following way: 27.6 g. carbamidomethyltrimethyl-ammoniumhydrochloride and 8.6 g. adipamide are dissolved in 50 cc. boiling water. To this a solution of 2 g. $K_2CO_3$ and 24 cc. formol solution (40% by wt. of formol) is added, after which the solution is heated at 70° C. for 10 minutes. The solution is subsequently diluted with water to 120 cc. and acidified with 1.8 g. oxalic acid and, if necessary, with so much HCl that the pH becomes 2.0.

In this bath a polyvinylalcohol membrane having a thickness of 0.15 mm. is impregnated, the adhering liquid is removed, the membrane is dried and heated at 140° C. for 10 minutes.

The concentration potential of these membranes amounts to over +50 mv., measured between solutions of 0.1 N KCl and 0.01 N KCl, and the resistance is so slight, that no reliable value can be stated, but amounts to less than 1 ohm/cm.$^2$. On the other hand the diusion is greater than that of membranes made from regenerated cellulose.

Example VI

A polyvinylalcohol membrane as described in Example V is impregnated in a bath, prepared as in Example I, but to which, in addition 6 cc. of an aqueous solution of formaldehyde have been added and further, after removal of the adhering liquid, dried and heated at 130° C. The membranes swell less in water than the membranes according to Example V, are slightly brittle in the dry but sufficiently strong in the wet state. The concentration potentials are approx. 50 mv., measured between 0.1 N KCl and 0.01 N KCl; the resistance measured in a solution of 0.1 N NaCl is approx. 4 ohms/cm.$^2$ and the diffusion, measured between solutions of 0.1 N NaCl and pure water is approx. $20\times10^{-4}$ m. eq./cm.$^2$/hour.

Example VII

A membrane of amylose is treated as indicated in Example I. In this way a positive membrane is obtained, the properties of which only slightly deviate from the membranes described therein. The swelling in water is greater, however, and the strength in the wet state slighter.

Addition of a quantity of the methylol compound of adipamide to the impregnating bath gives membranes a less strong swelling in water and the strength in the wet state consequently increases.

It may be remarked that in addition to the already mentioned properties these membranes possess the favourable property to keep their activity for a long time. Thus electrodialysis of various solutions at current densities of a few m. amp. to over 100 m. amp. per cm.$^2$ were carried out, without the properties of the membranes being substantially altered.

With electrodialysis of salt-containing water with a NaCl content of between 1.5 and 3 g. per litre, lives of over one thousand hours can be reached at a stream density of approx. 5 m. amp./cm.²

Finally it may be remarked that also with respect to polyvalent ions these membranes are well ion-selective, and are very suitable, for example, for the desalting of MgSO₄-containing brackish water.

In a few examples of electrodialysis, carried out with membranes prepared according to the invention, the action of these membranes can be made clear.

A. In an ordinary three-chamber apparatus, in which the anode compartment is separated from the dialysis compartment by a positive ion-selective membrane according to Example I, and the cathode compartment is separated from the dialysis compartment by a negative ion-selective membrane according to Example II, seawater with a NaCl content of 30 g./l. is introduced into all chambers.

By means of special measures the electrolysis products developing at the electrodes are rendered innocuous.

If the difference in concentration between the dialysate and rinsing liquids is small, the current yield at a current density of 2.5 m. amp./cm.² amounts to 70%; at a current density of 25 m. amp./cm.² approx. 60%

If the salt concentration of the dialysate decreases, the current yield becomes lower; with a decrease in the NaCl concentration of the dialysate to 8 g. per litre the current yield at a current density of 5 m. amp./cm.² yet amounts to 40% and after a decrease in the NaCl concentration of the dialysate to 0.5 g. per litre at 5 m. amp./cm.², the current yield is yet 35%.

B. With the desalting of brackish water with a salt content of 1.7 g. NaCl/l. in the same apparatus as described under A, and desalting to 0.5 g. NaCl/l., whereby the rinsing chambers are rinsed with the brackish water, the average current yield of the whole desalting process amounts to 80% at a current density of 2.5 m. amp./cm.².

We claim:

1. Homogeneous permselective membranes consisting essentially of the high molecular weight organic compounds containing reactive hydroxyl groups and etherified hydroxyl groups of the class consisting of cellulose, amylose and polyvinylalcohol linked to carbamidomethyltrimethylammoniumhydrochloride by an ether bond.

2. Homogeneous permselective membranes consisting essentially of high molecular weight organic compounds containing reactive hydroxyl groups and etherified hydroxyl groups of the class consisting of cellulose, amylose and polyvinylalcohol linked to alpha-alpha' adipamidosulfonic acid by an ether bond.

3. Process for electrodialyzing salt-containing solutions with application of membranes of high-molecular material of the class consisting of cellulose, amylose and polyvinylalcohol, in which hydrogen atoms of reactive hydroxyl groups have at least been partly replaced by

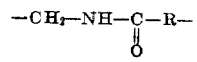

groups, in which R represents an organic group containing at least one ionic group of the class consisting of di- and tri-alkylamino groups, quaternary ammonium groups and sulfonic acid groups, the amount of said ionic group being at least about 0.2 milli-equivalent per gram of dry membrane substance.

4. Process for the manufacture of substantially homogeneous permselective membranes from high-molecular organic substances of the class consisting of cellulose, amylose and polyvinylalcohol by reacting at a pH value of about 2–2.5 membranes formed of said substances with carbamidomethyltrimethylammoniumhydrochloride.

5. A process for the manufacture of substantially homogeneous permselective membranes from a high-molecular weight organic substance of the class consisting of cellulose, amylose and polyvinylalcohol by introducing ionic groups in an amount of at least about 0.2 milli-equivalent per gram of dry membrane substance at a pH value of about 2 to 2.5 into membranes formed of said substance by reacting said membrane with alpha-alpha' adipamidosulfonic acid.

References Cited in the file of this patent
UNITED STATES PATENTS

| | | |
|---|---|---|
| 2,211,976 | Hubert et al. | Aug. 20, 1940 |
| 2,285,418 | D'Alelio | June 9, 1942 |
| 2,289,275 | Orthner et al. | July 7, 1942 |
| 2,322,887 | Schwartz | June 29, 1943 |
| 2,322,888 | Schwartz | June 29, 1943 |
| 2,584,177 | Wohnsiedler | Feb. 5, 1952 |
| 2,636,851 | Juda et al. | Apr. 28, 1953 |
| 2,636,852 | Juda et al. | Apr. 28, 1953 |

UNITED STATES PATENT OFFICE

CERTIFICATE OF CORRECTION

Patent No. 2,805,196 September 3, 1957

Hermannus Gerhardus Roebersen et al.

It is hereby certified that error appears in the printed specification of the above numbered patent requiring correction and that the said Letters Patent should read as corrected below.

Column 4, line 48, for "dcellulose" read -- cellulose --; column 5, line 32, for "solution" read -- solutions --; line 46, for "0.1 N KCl" read -- 0.1 N and 0.01 N KCl --; column 6, line 43, for "diusion" read -- diffusion --.

Signed and sealed this 29th day of October 1957.

(SEAL)
Attest:
KARL H. AXLINE
Attesting Officer

ROBERT C. WATSON
Commissioner of Patents